3,012,997
PREPARATION OF POLYMERS
Witold R. Kocay, Stamford, Conn., and Marvin Wishman, White Plains, N.Y., assignors to American Cyanamid Company, New York, N.Y., a corporation of Maine
No Drawing. Filed Jan. 27, 1958, Ser. No. 711,133
7 Claims. (Cl. 260—80.5)

This invention relates to the preparation of polymers. More particularly, the invention is concerned with certain new and useful improvements in a method of preparing a polymer of polymerizable material comprising at least one compound containing a $CH_2=C<$ grouping by polymerizing said polymerizable material in an aqueous medium at a pH not higher than about 4.0, using a particular polymerization catalyst system, namely, a redox-catalyst system comprising chlorate ions and sulfite ions. The invention is especially useful and valuable in the preparation of polymers (homopolymers and copolymers) of acrylonitrile.

Polymers of acrylonitrile and of other polymerizable organic compounds containing at least one ethylenic bond are, of course, known. These polymers have achieved wide use in the production of many valuable commercial products, e.g., plastic and coating compositions, synthetic rubber, and, more recently, synthetic fibers.

Difficulties have been encountered in polymerizing certain of the aforementioned polymerizable organic compounds, e.g., acrylonitrile alone and with other monomers, and especially in controlling the average molecular weight and molecular-weight distribution of the polymer; and considerable effort has been spent in developing practical processes for preparing these extremely useful homopolymers and copolymers that would overcome these difficulties. Thus, recent developments in the polymerization of acrylonitrile have been concerned largely with polymerization in aqueous media, for instance, as described in Jacobson United States Patent No. 2,436,926, March 2, 1948, Brubaker and Jacobson United States Patent No. 2,462,354, February 22, 1949, Rothrock United States Patent No. 2,640,049, May 26, 1953, and Scheiderbauer et al. United States Patent No. 2,748,106, May 29, 1956; and with the use of redox-catalyst systems that aim to give a high yield of polymer in a short time at a moderate temperature. Redox-catalyst systems comprising a peroxy compound and a sulfoxy compound, such as, for example, ammonium persulfate and sodium bisulfite, have been used for the homopolymerization and copolymerization of acrylonitrile and other vinyl compounds (see, for example, the aforementioned United States patents); and, also redox systems comprising a water-soluble chlorate, e.g., sodium or potassium chlorate, and a water-soluble sulfite or bisulfite, e.g., sodium sulfite or bisulfite (see, for instance, Hill United States Patent No. 2,673,192, March 23, 1954, Cresswell United States Patent No. 2,751,374, June 19, 1956, and Mallison United States Patent No. 2,777,832, January 15, 1957).

The problems encountered in forming spinnable or fiber-forming polymers, more particularly copolymers of acrylonitrile and a vinylpyridine, that are uniform from the standpoint of molecular-weight distribution and structure, and in other characteristics, are pointed out in the above-named Rothrock Patent No. 2,640,049.

The present invention is based on our discovery that, in a polymerization method of the kind broadly described in the first paragraph of this specification, the average molecular weight of the polymer which forms can be increased by increasing the ratio of molar equivalents of chlorate ions to a polymerizable material (more particularly a monomeric material) comprising at least one compound containing a $CH_2=C<$ grouping, e.g., acrylonitrile, without changing the ratio of molar equivalents of sulfite ions to said polymerizable material. This discovery was quite surprising and unexpected; in no way could have been predicted from the teachings of the prior art; and its practical advantages will be immediately apparent to those skilled in the art.

Contrary to the above findings, Scheiderbauer et al., supra, in acknowledging the prior art, stated that "the only known method of increasing conversion was to increase the concentration of the redox catalyst system," which "always resulted in increased yield of polymer, but the molecular weight of the polymer formed was inversely proportional to the yield." By the process of the invention of Scheiderbauer et al., using a different catalyst system, conversions were increased to about 90% or more through increasing the concentration of the monomer in the reactant feed streams and suitably lowering the catalyst and activator concentrations relative to the monomer.

The applicants' findings are also directly contrary to the teachings in the Hill patent, supra, which shows (tables in column 7) that, in polymerizing vinyl chloride, using 0.038 part $KClO_3$ and 0.232 part $Na_2SO_3$, a polymer having a molecular weight of 97,700 was obtained; and using 0.15 part $KClO_3$ and 0.232 part $Na_2SO_3$, a polymer having a molecular weight of 92,800 was obtained. In other words, Hill found that increasing the amount of $KClO_3$ catalyst almost four-fold, while keeping the amount of $Na_2SO_3$ constant, resulted in a decrease in molecular weight. In marked contrast to the teachings of Hill, if only the ratio of molar equivalents of chlorate ions to polymerizable material (i.e., ratio of chlorate to monomer) is increased, the molecular weight increases.

It may also be noted that, if only the ratio of sulfite ions to polymerizable material (i.e., ratio of sulfite to monomer) is increased, the molecular weight is decreased. Therefore, a proper simultaneous increase of both chlorate and sulfite will keep the molecular weight at the same level, but the total amount of catalyst added will be increased. Hence, contrary to the teachings in the Scheiderbauer et al. patent, supra, the percentage conversion of monomer to polymer can be increased by using more total catalyst (chlorate plus sulfite) without the deficiency noted by Scheiderbauer et al. with a different catalyst system. Furthermore, it has been found that if the chlorate and sulfite concentrations are increased to a sufficiently high degree, while continuing to maintain the desired molecular weight, the molecular weight then becomes completely independent of catalyst concentration, so that it is no longer effected by minor variations in the catalyst-feed rate. Thus, in practicing our invention and when holding all other conditions constant, there is an optimum chlorate-sulfite concentration (ratio of total chlorate plus sulfite to polymerizable material) above which concentration the molecular weight is no longer dependent on the catalyst (chlorate-sulfite) concentration so long as the molar ratio of chlorate to sulfite is not altered.

As shown by the aforementioned Hill, Cresswell, and Mallison patents, acidic aqueous catalyst systems containing reducible chlorate ions and oxidizable sulfoxy ions have been suggested for use in the polymerization of various vinyl compounds, including vinyl chloride, acrylonitrile, vinyl acetate, and others. The oxidizable sulfoxy ions used in such systems have generally been of the group consisting of sulfite, bisulfite, and hydrosulfite ions, and these same sulfoxy ions comprise a preferred group employed in practicing the present invention, but it is not intended that the invention shall be limited to the use of only this group. While the components of an oxidation-reduction or redox-catalyst system of this nature may be introduced as chloric and sulfurous acids, these acids are relatively unstable; therefore, it is usually more convenient to add the desired ions to the polymerization system in the form of a water-soluble chlorate and a water-soluble salt containing the oxidizable sulfoxy ion, e.g., a water-soluble sulfite, together with a suitable acid such, for instance, as sulfuric acid, phosphoric acid, hydrochloric acid, etc. During polymerization in an aqueous system containing a chlorate-sulfoxy catalyst combination, the chlorine is reduced and the sulfur simultaneously oxidized.

The improvement of the present invention is applicable in a polymerization method of the kind broadly described in the first paragraph of this specification, and which can be carried out batchwise, semi-continuously or continuously. A continuous method is preferred. Polymerization can be effected while the polymerizable material (e.g., a single or a plurality of monomers) is dissolved or dispersed (as by emulsification, for example) in an aqueous medium having a pH of 4.0 or less, advantageously from about 2.0 to about 3.6. The reaction mass comprises the polymerizable material, the aforesaid aqueous medium and a redox-polymerization-catalyst system that includes, as essential components, (a) a water-soluble chlorine compound that yields chlorate ions in an aqueous acidic medium and (b) a water-soluble sulfoxy compound that yields oxidizable sulfoxy ions in an aqueous acidic medium. This aqueous acidic medium advantageously comprises an aqueous solution of a nonoxidizable acid having a dissociation constant greater than $10^{-3}$, e.g., sulfuric, nitric, phosphoric, hydrochloric or other strong acid.

When the polymerization reaction is carried out continuously, one can, if desired or required, charge additional water to the reactor, separately or with one or another of the various feeds of the aforementioned ingredients, so that a desired concentration of materials in the aqueous medium is maintained in the reactor. It is usually preferable to limit the amount of water so that the total weight of polymerizable monomers is between about 15% and 50% of the total material charged during the polymerization reaction. This is especially true when the polymerizable material comprises a substantial amount of acrylonitrile, since the resulting suspension of polymer then has excellent pumping characteristics, as well as outstanding drainage or filtering qualities. Additional economies are, of course, realized in that a small volume of the reaction mass is processed and handled. No difficulties are encountered with respect to separation of polymerizable material, since the polymerizable ingredient or ingredients are charged at a rate which is correlated with the rate of polymerization in such a manner that separation of polymerizable material, specifically monomeric material, does not occur.

In the redox-polymerization-catalyst system employed, the amount of chlorate ions introduced to the reaction mass (reactor) generally will be between about 0.1% and about 2.0% of the weight of the polymerizable monomeric material, and the oxidizable ions, specifically sulfoxy ions, will be present in quantity ranging between about 0.1% and about 6% by weight on the same basis. Larger amounts of the catalyst components, e.g., 3 or more percent of chlorate ions and 9 or more percent of sulfoxy ions, are operative, but appear to provide no additional benefits. When the oxidizing and reducing components are present in oxidation and reduction equivalents, then in the case of the preferred oxidizable component, 3 moles of the sulfurous acid or a sulfite react per mole of chloric acid or a chlorate. The ratio is the same for bisulfites, but only 1.5 moles of a meta-bisulfite are required, since such salts ionize to form $HSO_3^-$ ions.

In the redox polymerization catalyst system used in practicing the present invention, any water-soluble chlorine compound that yields chlorate ions in an aqueous acidic medium can be used, for instance: chloric acid, ammonium, and the various alkali-metal (sodium, potassium, lithium, etc.) chlorates; and the various water-soluble, alkaline-earth metal and heavy metal chlorates.

Illustrative examples of reducing agents that can be employed are sulfites, bisulfites, and metabisulfites corresponding to the chlorates named in the preceding paragraph, sulfur dioxide, and diethyl and other water-soluble dialkyl sulfites.

By the term "sulfite ions" as used herein and in the appended claims is intended to be included the various sulfoxy species, more particularly $H_2SO_3$ and/or $HSO_3^-$ and $SO_3^=$, the proportionate amounts of these species being a function of pH. We believe that the active component is probably the $H_2SO_3$ molecule.

Relatively low polymerization temperatures, for example, temperatures ranging from about 20° C. to about 70° C., are desirable. Particularly good results are generally obtained when the temperature of polymerization is maintained within the range of from about 35° C. to about 65° C.

It is desirable to conduct the process of the present invention in the absence of oxygen, which has a definite inhibiting effect on the polymerization reaction. Suitable inert gases, such as nitrogen and carbon dioxide, may be used to displace air in the reaction zone.

Polymerizable materials that can be polymerized (homopolymerized or copolymerized) include those mentioned in the aforesaid Hill, Cresswell, and Mallison patents. Other examples (some of which are named by Hill, Cresswell, or Mallison in their patents) are the vinyl aromatic and isopropenyl aromatic compounds, more particularly the different vinyl aromatic and isopropenyl aromatic hydrocarbons (e.g., the various dialkyl styrenes, isopropenyl toluene, etc.), other aliphatic compounds containing a $CH_2=C<$ grouping, e.g., the various substituted acrylonitriles (e.g., methacrylonitrile, ethacrylonitrile, phenylacrylonitrile, etc.), the various substituted acrylamides (e.g., methacrylamide, ethacrylamide, the various N-substituted acrylamides and N-substituted alkacrylamides, for instance, N-methylol acrylamide, N-monoalkyl and -dialkyl acrylamides and methacrylamides, e.g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e.g., N-monophenyl and -diphenyl acrylamides and methacrylamides, etc.), vinyl esters, e.g., vinyl acetate, vinyl chloroacetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e.g., methacrylic acid, ethacrylic acid, phenylacrylic acid, etc.), more particularly the alkyl esters of an acrylic acid, e.g., the ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids including the alkyl acrylates containing not more than four carbon atoms in the alkyl grouping, examples of which are given above, diallyl amine, dimethallyl amine, vinyl ethyl ether, diallyl benzene, as well as other vinyl aromatic and vinyl aliphatic compounds, and other compounds containing a $CH_2=C<$ grouping, more particularly a single $CH_2=<$ grouping. Two, three, four, five, or any desired higher number of monomers can be admixed and copolymerized in accordance with the present invention. In producing fiber-forming copolymers, and which preferably have an average molecular weight within the range of from about 60,000 to about 90,000, we prefer that the modifying comonomer employed be one that contains a single $CH_2=C<$ grouping. The average "molecular weight," as defined herein, is determined from an absolute viscosity value of a 1% solution of the polymer in 50% aqueous sodium thiocyanate.

In practicing the present invention to produce fiber-forming (fiber-formable) acrylonitrile copolymers, the monomeric material generally comprises more than 50%, more particularly at least 70% by weight of acrylonitrile, e.g., 100% acrylonitrile; or more than 50% by weight of acrylonitrile while the remainder is constituted of at least one other different compound which is copolymerizable with acrylonitrile and which contains a $CH_2=C<$ grouping. Thus, in addition to acrylonitrile, the polymerizable material may include a plurality of different compounds which are copolymerizable with acrylonitrile and each one of which contains a $CH_2=CH-$ grouping, at least one of said compounds being a vinylpyridine. The present invention provides good results in preparing a copolymer of monomeric material comprising at least 80% by weight of acrylonitrile, from 2 to 15% by weight of a vinylpyridine, and from 2 to 15% by weight of vinyl acetate, methyl acrylate, acrylamide, methacrylamide, acrylic acid, methacrylic acid, methacrylonitrile, or the like.

Illustrative examples of vinylpyridines that can be copolymerized with acrylonitrile, alone or with one or more other copolymerizable monomers, by the method of the present invention, include vinylpyridines represented by the formula I 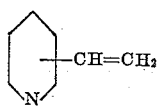

and which include 2-vinylpyridine, 3-vinylpyridine, and 4-vinylpyridine; methyl vinylpyridines represented by the formula II 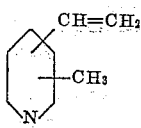

and which include 2-methyl-3-vinylpyridine, 2-methyl-5-vinylpyridine, 3-vinyl-4-methylpyridine, 3-vinyl-5-methylpyridine, 2-vinyl-3-methylpyridine, 2-vinyl-4-methylpyridine, 2-vinyl-5-methylpyridine, 2-vinyl-6-methylpyridine, 2-methyl-4-vinylpyridine, and 3-methyl-4-vinylpyridine. The vinylpyridines embraced by Formula II are a preferred sub-group within a broader class of vinylpyridines that are advantageously employed in continuously making dyeable, fiber-forming binary and ternary polymers in accordance with the instant invention and which may be represented by the formula III 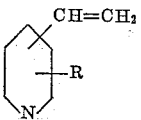

wherein R represents a lower alkyl radical, more particularly a methyl, ethyl, propyl (including n-propyl and isopropyl) or butyl (including n-butyl, isobutyl, sec.-butyl and tert.-butyl) radical. Other examples include the 2- and 4-vinylquinolines, the various vinyl isoquinolines, 2-vinyl-4,6-dimethylpyridine, 2-vinyl-4,6-diethylpyridine, and others embraced by the formula IV 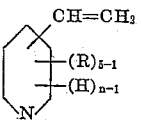

where R represents a lower alkyl radical, examples of which have been given hereinbefore, and $n$ represents an integer from 1 to 5, inclusive.

In order that those skilled in the art may better understand how the present invention can be carried into effect, the following examples are given by way of illustration and not by way of limitation. All parts and percentages are by weight unless otherwise stated.

Example 1

(A)

One hundred and fifty-two (152) parts (2.87 moles) of acrylonitrile, 8 parts (0.093 mole) of methyl acrylate, 1.2 parts (0.033 mole) of hydrogen chloride, and 1439 parts of deionized water are charged into a round-bottomed flask. The flask is placed in a constant-temperature bath, and a condenser, thermometer, stirrer, nitrogen-inlet tube, and dropping funnel are attached. The monomer mixture is heated at 40° C. under nitrogen for one hour. The catalyst, 0.716 part (0.00672 mole) of sodium chlorate and 5.04 parts (0.04 mole) of sodium sulfite, is dissolved in 150 cc. of water into the dropping funnel. Forty (40) percent of the catalyst, 60 cc. of solution, is rapidly added to the reaction vessel. After 25 minutes, an additional 22.5 cc. of catalyst solution is added. The remaining catalyst solution is added at 25-minute intervals in volumes of 22.5, 15, 15, 7.5, and 7.5 cc. Catalyst addition is complete in 2.5 hours. The mixture is agitated 1.5 hours longer, and the polymer is collected by filtration. The pH of the effluent mother liquor is 2.5. In this example, the mole ratio of sodium sulfite to monomer is 0.0135, while the mole ratio of sodium chlorate to monomer is 0.00227. Conversion of monomer to polymer is 85 percent of theory. The polymer has an average molecular weight of 77,000.

(B)

The above example is repeated except that 0.852 part (0.008 mole) of sodium chlorate is used instead of 0.716 part. In this case, the mole ratio of sodium chlorate to monomer is 0.0027. Conversion of monomer to polymer is 86 percent of theory. The polymer has an average molecular weight of 80,500.

A comparison of the (A) and (B) portions of this example, and of corresponding portions of other examples which follow, shows how the average molecular weight of the polymer is increased by increasing the ratio of molar equivalents of chlorate ions to the polymerizable material without changing the ratio of molar equivalents of sulfite ions to the polymerizable material.

Example 2

(A)

One hundred and thirty-six (136) parts (2.57 moles) of acrylonitrile, 12 parts (0.14 mole) of vinyl acetate, 12 parts (0.10 mole) of 2-methyl-5-vinylpyridine, 4.02 parts (0.11 mole) of hydrogen chloride, and 980 parts of deionized water are charged into a round-bottomed flask. The apparatus is assembled as in Example 1. The catalyst, 0.330 part (0.0031 mole) of sodium chlorate and 2.358 parts (0.0187 mole) of sodium sulfite, is dissolved in 150 cc. of water into a dropping funnel. Polymerization is conducted as in Example 1. The pH of the effluent mother liquor is 2.5. In this example, the mole ratio of sodium sulfite to monomer is 0.00665, while the mole ratio of sodium chlorate to monomer is 0.0011. Conversion of monomer to polymer is 59 percent of theory. The polymer has an average molecular weight of 46,000.

(B)

The above example is repeated, except that 0.664 part (0.00623 mole) of sodium chlorate is used. In this case, the mole ratio of sodium chlorate to monomer is 0.00222. Conversion of monomer to polymer is 67% of theory. The polymer has an average molecular weight of 67,000.

(C)

The (A) portion of this example is repeated, except that 1.98 parts (0.0186 mole) of sodium chlorate is used. In this case, the mole ratio of sodium chlorate to monomer is 0.00662. Conversion of monomer to polymer is 72 percent of theory. The polymer has an average molecular weight of 100,500.

(D)

The (A) portion of this example is again repeated, except that 5.97 parts (0.056 mole) of sodium chlorate is used. In this case, the mole ratio of sodium chlorate to monomer is 0.0199. Conversion of monomer to polymer is 78 percent of theory. The polymer has an average molecular weight of 144,000.

*Example 3*

(A)

One hundred and thirty-six (136) parts (2.57 moles) of acrylonitrile, 13.5 parts (0.157 mole) of methyl acrylate, 10.5 parts (0.10 mole) of 2-vinylpyridine, 4.38 parts (0.12 mole) of hydrogen chloride, and 980 parts of deionized water are charged into a round-bottomed flask. The apparatus is assembled as in Example 1. The catalyst, 0.716 part (0.00672 mole) of sodium chlorate and 3.45 parts (0.0284 mole) of sodium sulfite, is dissolved in 150 cc. of water into a dropping funnel. Polymerization is conducted as in Example 1. The pH of the effluent mother liquor is 2.5. In this example, the mole ratio of sodium sulfite to monomer is 0.010, while the mole ratio of sodium chlorate to monomer is 0.00238. Conversion of monomer to polymer is 48 percent. The polymer has an average molecular weight of 75,500.

(B)

The above example is repeated, except that 0.988 part (0.0093 mole) of sodium chlorate is used instead of 0.716 part. In this case, the mole ratio of sodium chlorate to monomer is 0.0033. Conversion of monomer to polymer is 62 percent of theory. The polymer has an average molecular weight of 107,500.

*Example 4*

(A)

One hundred and forty-four (144) parts (2.72 moles) of acrylonitrile, 8 parts (0.093 mole) of methyl acrylate, 8 parts (0.076 mole) of 4-vinylpyridine, 3.05 parts (0.084 mole) of hydrogen chloride, and 980 parts of deionized water are charged into a round-bottomed flask. The apparatus is assembled as in Example 1. The catalyst, 0.426 part (0.0040 mole) of sodium chlorate and 3.04 parts (0.0241 mole) of sodium sulfite, is dissolved in 150 cc. of water into a dropping funnel. Polymerization is conducted as in Example 1. The pH of the effluent mother liquor is 2.0. In this example, the mole ratio of sodium sulfite to monomer is 0.00834, while the mole ratio of sodium chlorate to monomer is 0.00138. Conversion of monomer to polymer is 53 percent. The polymer has an average molecular weight of 46,000.

(B)

The above example is repeated, except that 0.648 part (0.00608 mole) of sodium chlorate is used instead of 0.426 part. In this case, the mole ratio of sodium chlorate to monomer is 0.0022. Conversion of monomer to polymer is 63 percent of theory. The polymer has an average molecular weight of 63,500.

*Example 5*

One hundred and sixty (160) parts (3.02 moles) of acrylonitrile, 1.2 parts (0.033 mole) of hydrogen chloride, and 1439 parts of deionized water are charged into a round-bottomed flask. The apparatus is assembled as in Example 1. The catalyst, 0.395 part (0.00371 mole) of sodium chlorate and 4.67 parts (0.0371 mole) of sodium sulfite, is dissolved in 150 cc. of water into a dropping funnel. Polymerization is conducted as in Example 1. The pH of the effluent mother liquor is 2.7. In this example, the mole ratio of sodium sulfite to monomer is 0.0123, while the mole ratio of sodium chlorate to monomer is 0.00123. Conversion of monomer to polymer is 68 percent of theory. The polymer has an average molecular weight of 84,000.

The above example is repeated, except that 0.99 part (0.0093 mole) of sodium chlorate is used instead of 0.395 part. In this case, the mole ratio of sodium chlorate to monomer is 0.00308. Conversion of monomer to polymer is 82 percent of theory. The polymer has an average molecular weight of 95,000.

*Example 6*

(A)

A water-jacketed reactor having a volume of 6.4 liters is supplied with a propeller-type stirrer, driven by a motor rotating at approximately 900 r.p.m. The reactor is equipped with a delivery-feed system; and, at its top, with an overflow tube. Polymer is collected by continuous filtration of the slurry overflow.

Six thousand four hundred (6,400) grams of water slurry containing 20% polymer prepared in a previous similar reaction ("seed" polymer) is charged to the reactor, adjusted to a pH of about 2 with nitric acid, and its temperature is brought to 45° C. A stream of monomers is introduced to the reactor through one of three delivery tubes. A second stream consists of an aqueous solution of weighed amounts of sodium chlorate and sodium sulfite. The third stream consists of an aqueous solution of nitric acid of known concentration.

Polymer produced during the first four hours of reaction is discarded. Under the conditions of reaction, it has been found that more than 92 percent of the seed polymer has been purged and that a steady state or equilibrium is set up before any polymer product is collected.

The temperature of reaction is maintained at 45° C. Monomer concentration and residence time are controlled by the feed rates at 28 percent monomer concentration and 1.5 hour residence time in the reactor. The pH is maintained at 2.2.

The composition of the feeds is as follows:

Feed I —Monomers (85.9% acrylonitrile, 7.5% vinyl acetate and 6.6% 2-vinylpyridine)
Feed II—Catalyst (64.6 grams of $NaClO_3$ and 382.0 grams of $Na_2SO_3$ in solution in 16 liters of water)
Feed III—Acid (640 g. of $HNO_3$ in solution in 16 liters of water)

Monomers (Feed I) are fed at 1410 cc./hr., 1155 grams/hr. Catalyst (Feed II) is fed at 1430 cc./hr. Therefore, the rate of $NaClO_3$/hr. is 5.77 grams/hr. Acid (Feed III) is fed at 1430 cc./hr. At equilibrium, the conversion of monomer to polymer is 50 percent. The polymer has an average molecular weight of 49,000.

(B)

The above example is repeated in every detail except that the catalyst (Feed II) contains 107.9 grams of $NaClO_3$ in a 16-liter solution instead of 64.6 grams. Since all feed rates are the same, the rate of $NaClO_3$/hr. is 9.65 grams/hr. At equilibrium, the conversion of monomer to polymer is 73 percent. The polymer has an average molecular weight of 98,500.

*Example 7*

(A)

The procedure of Example 6 is followed, except for feed composition.

Feed I —Monomers (90% acrylonitrile, 5% vinyl acetate, 5.0% 2-methyl-5-vinylpyridine)
Feed II —Catalyst (57.6 grams of $NaClO_3$ and 272.0 grams of $Na_2SO_3$ in solution in 16 liters of water)
Feed III—Acid (299 g. of $HNO_3$ in solution in 16 liters of water)

The rate of NaClO₃/hr. is 5.15 grams/hr. Since the monomer feed rate is 1155 grams/hr., 0.446 gram of NaClO₃ is fed per 100 grams of monomer. The pH is maintained at 3.3. At equilibrium, the conversion of monomer to polymer is 82 percent of theory. The polymer has an average molecular weight of 44,000.

(B)

The above example is repeated in every detail except that the catalyst (Feed II) contains 115.2 grams of sodium chlorate in a 16-liter solution instead of 57.6 grams. Since all feed rates are the same, 0.89 gram of NaClO₃ is used per 100 grams of monomer. At equilibrium, the conversion of monomer to polymer is 86 percent of theory. The polymer has an average molecular weight of 71,000.

*Example 8*

(A)

The procedure of Example 6 is followed, except for feed composition.

Feed I —Monomers (85.9% acrylonitrile, 7.5% vinyl acetate, and 6.6% 4-vinylpyridine)
Feed II —Catalyst (51.2 grams of NaClO₃ and 302.0 g. of Na₂SO₃ in solution in 16 liters of water)
Feed III—Acid (640 grams of HNO₃ in solution in 16 liters of water)

The rate of NaClO₃/hr. is 4.56 grams/hr. Since the monomer feed rate is 1155 grams/hr., 0.395 gram of NaClO₃ is fed per 100 grams of monomer. The pH is maintained at 2.4. At equilibrium, the conversion of monomer to polymer is 57 percent of theory. The polymer has an average molecular weight of 47,000.

(B)

The above example is repeated in every detail, except that the catalyst (Feed II) contains 64.0 grams of sodium chlorate in a 16-liter solution instead of 51.2 grams. Since all feed rates are the same, 0.495 gram of NaClO₃ is used per 100 grams of monomer. At equilibrium, conversion of monomer to polymer is 71 percent of theory. The polymer has an average molecular weight of 56,000.

We claim:

1. The method which comprises preparing a reaction mass comprising a polymerizable material in an aqueous medium having a pH not higher than about 4.0 and having a content of said polymerizable material not greater than 50%, said polymerizable material being selected from the group consisting of (1) acrylonitrile and (2) mixtures containing more than 50% by weight of acrylonitrile, the balance being at least one other different compound which is copolymerizable with acrylonitrile and which contains a $CH_2=C<$ grouping; introducing into said reaction mass a redox-catalyst system comprising chlorate ions and sulfite ions, the amount of the chlorate ions being within the range of from about 0.1% to about 3% and that of the sulfite ions within the range of from about 0.1% to about 9%, said percentages being by weight of the said polymerizable material; polymerizing the reaction mass containing the said redox-catalyst system and polymerizable material to obtain a polymer of a first, average molecular weight; and, at any norm of chlorate ions and of sulfite ions within the aforementioned ranges of percentage proportions of said ions to said polymerizable material and while keeping the said reaction mass at a substantially constant temperature and at a substantially constant pH not higher than about 4.0, increasing the average molecular weight of the polymer above said first, average molecular weight by increasing above said norm the ratio of molar equivalents of chlorate ions to said polymerizable material without changing the ratio of molar equivalents of sulfite ions to said polymerizable material, the amounts of the chlorate and sulfite ions after said increase of chlorate ions remaining, however, within the aforesaid ranges of from about 0.1% to about 3% of chlorate ions and about 0.1% to about 9% of sulfite ions based on the weight of said polymerizable material.

2. A method as in claim 1 wherein the amount of the chlorate ions is within the range of from about 0.1% to about 2% and that of the sulfite ions within the range of from about 0.1% to about 6%, the said percentages being based on the weight of the polymerizable material defined in claim 1.

3. The method which comprises preparing a reaction mass comprising a monomeric polymerizable material in an aqueous medium having a pH of from about 2.0 to about 3.6 and having a content of said polymerizable material not greater than 50%, said monomeric material being selected from the group consisting of (1) acrylonitrile and (2) mixtures containing more than 50% by weight of acrylonitrile, the balance being at least one other different compound which is copolymerizable with acrylonitrile and which contains a $CH_2=C<$ grouping; introducing into said reaction mass a redox-catalyst system comprising chlorate ions and sulfite ions, the amount of the chlorate ions being within the range of from about 0.1% to about 2% and that of the sulfite ions within the range of from about 0.1% to about 6%, said percentages being by weight of the said monomeric polymerizable material; polymerizing the reaction mass containing the said redox-catalyst system and monomeric polymerizable material to obtain a polymer of a first, average molecular weight; and, at any norm of chlorate ions and of sulfite ions within the aforementioned ranges of percentage proportions of said ions to said monomeric material and while keeping the said reaction mass at a substantially constant temperature and at a substantially constant pH between about 2.0 and about 3.6, increasing the average molecular weight of the polymer above said first, average molecular weight by increasing above said norm the ratio of molar equivalents of chlorate ions to said polymerizable material without changing the ratio of molar equivalents of sulfite ions to said polymerizable material, the amounts of the chlorate and sulfite ions after said increase of chlorate ions remaining, however, within the aforesaid ranges of from about 0.1% to about 2% of chlorate ions and about 0.1% to about 6% of sulfite ions based on the weight of said polymerizable material.

4. A method as in claim 3 wherein the chlorate and sulfite ions are derived from sodium chlorate and sodium sulfite, respectively.

5. A method as in claim 3 wherein the monomeric polymerizing material comprises at least 70% by weight of acrylonitrile.

6. The method which comprises preparing a reaction mass comprising monomeric material in an aqueous medium having a pH of from about 2.0 to about 3.6 and having a content of said material not greater than 50%, said monomeric material comprising at least 80% by weight of acrylonitrile, from 2 to 15% by weight of vinyl acetate, and from 2 to 15% by weight of a vinylpyridine; introducing into said reaction mass a redox-catalyst system comprising chlorate ions and sulfite ions derived from sodium chlorate and sodium sulfite, respectively, the amount of the chlorate ions being within the range of from about 0.1% to about 2% and that of the sulfite ions within the range of from about 0.1% to about 6%, said percentages being by weight of the said monomeric material; polymerizing the reaction mass containing the said redox-catalyst system and monomeric material to obtain a polymer of a first, average molecular weight; and, at any norm of chlorate ions and of sulfite ions within the aforementioned ranges of percentage proportions of said ions to said monomeric material and while keeping the said reaction mass at a substantially constant temperature and at a substantially constant pH between about 2.0 and about 3.6, increasing the average molecular weight of the polymer above said first, average molecular weight by increasing above said norm the ratio of molar equivalents of chlorate ions to said monomeric material without changing the ratio of molar equivalents of sulfite ions to said monomeric material, the amounts of the chlorate and sulfite ions after said increase of chlorate ions remaining, however, within the aforesaid ranges of from about 0.1% to about 2% of chlorate ions and about 0.1% to about 6% of sulfite ions based on the weight of said monomeric material.

7. The method which comprises effecting polymerization of a polymerizable material to a polymer of a first, average molecular weight, said polymerization being effected in an aqueous medium having a pH not higher than about 4.0 and using a redox-catalyst system comprising chlorate ions and sulfite ions, and said polymerizable material being selected from the group consisting of (1) acrylonitrile and (2) mixtures containing more than 50% by weight of acrylonitrile, the balance being at least one other different compound which is copolymerizable with acrylonitrile and which contains a $CH_2=C<$ grouping, the content of said polymerizable material in the aqueous medium being not greater than 50% and the amount of the aforesaid chlorate ions being within the range of from about 0.1% to about 3% and that of the aforesaid sulfite ions within the range of from about 0.1% to about 9%, said percentages being by weight of the said polymerizable material; and, at any norm of chlorate ions and of sulfite ions within the aforementioned ranges of percentage proportions of said ions to said polymerizable material and while keeping the reaction mass at a substantially constant temperature and at a substantially constant pH not higher than about 4.0, increasing the average molecular weight of the polymer above said first, average molecular weight by increasing above said norm the ratio of molar equivalents of chlorate ions to said polymerizable material without changing the ratio of molar equivalents of sulfite ions to said polymerizable material, the amounts of the chlorate and sulfite ions after said increase of chlorate ions remaining, however, within the aforesaid ranges of from about 0.1% to about 3% of chlorate ions and about 0.1% to about 9% of sulfite ions based on the weight of said polymerizable material.

References Cited in the file of this patent

UNITED STATES PATENTS

| | | |
|---|---|---|
| 2,628,223 | Richards | Feb. 10, 1953 |
| 2,673,192 | Hill | Mar. 23, 1954 |
| 2,751,374 | Cresswell | June 19, 1956 |
| 2,769,793 | Ham | Nov. 6, 1956 |
| 2,777,832 | Mallison | Jan. 15, 1957 |

UNITED STATES PATENT OFFICE
CERTIFICATION OF CORRECTION

Patent No. 3,012,997            December 12, 1961

Witold R. Kocay et al.

It is hereby certified that error appears in the above numbered patent requiring correction and that the said Letters Patent should read as corrected below.

Column 3, line 59, after "in" insert -- a --; column 4, line 61, for "$CH_2=<$" read -- $CH_2=C<$ --; column 10, line 50, for "polymerizing" read -- polymerizable --.

Signed and sealed this 24th day of April 1962.

(SEAL)
Attest:

ESTON G. JOHNSON
Attesting Officer

DAVID L. LADD
Commissioner of Patents